Feb. 3, 1953 H. F. SCHOEMEHL ET AL 2,627,416

INDUCTION HEATING OF RECORDING STYLI

Filed March 31, 1950

INVENTORS
HENRY F. SCHOEMEHL
& HARRY D. WARD
BY Morris L. Rabkin
ATTORNEY

Patented Feb. 3, 1953 2,627,416

UNITED STATES PATENT OFFICE 2,627,416

INDUCTION HEATING OF RECORDING STYLI

Henry F. Schoemehl, Seelyville, and Harry D. Ward, Indianapolis, Ind., assignors to Radio Corporation of America, a corporation of Delaware Application March 31, 1950, Serial No. 153,248

11 Claims. (Cl. 274—38)

This invention relates to sound recording apparatus employing a heated recording stylus and more particularly to high frequency induction heating of such stylus.

In the art of sound recording, the use of a heated stylus has been found to possess certain advantages. While various methods of heating the stylus have been proposed heretofore, these methods have been found unsuitable particularly for high fidelity sound recordings. For example, in one method, the stylus comprises an electrically conductive member. The stylus is connected in circuit with a suitable source of electrical energy so that the resistance it offers to the flow of current will cause it to become heated. If a sapphire or other recording stylus of non-conductive material is used, this method cannot be employed. In other cases, providing the necessary structure to connect the stylus in the electrical circuit presents a problem.

Another method which has been used is that of radiant heating. A previously proposed embodiment of this method requires the use of a coil of wire which is disposed in close proximity to and surrounds the stylus. The coil is connected with a source of electrical energy and is heated to a bright red condition. Such a method has been found unsatisfactory because, during the recording operation, chips of lacquer from the recording surface come in contact with the hot coil and are ignited.

The primary object of the present invention, therefore, is to provide apparatus for heating a recording stylus which will overcome the above as well as other disadvantages of prior art heating apparatus.

Another object of the present invention is to provide heating apparatus for a sound recording stylus which will heat the stylus without interfering with the recording operation.

A further object of the present invention is to provide a practical means for heating a recording stylus.

Still another object of the present invention is to provide a simple and highly efficient apparatus for inductively heating the stylus of sound recording instruments.

In accordance with the present invention, the recording stylus is heated inductively from a winding disposed in spaced relation to the stylus. If the stylus is constituted of non-conductive material, conductive means are provided on a portion of the stylus in the region thereof adjacent the inductive winding. In order to produce the necessary heat by induction, the inductive winding is connected to a suitable source of alternating, high frequency current.

Figure 1:
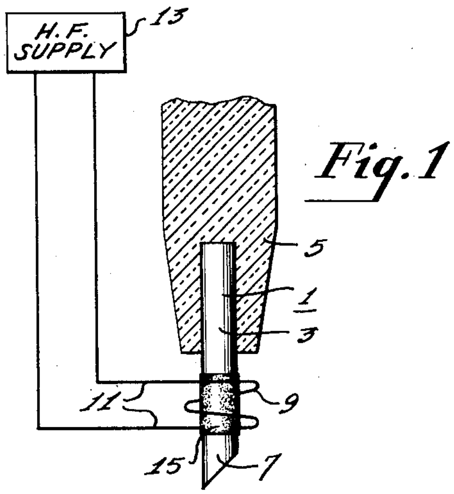
Figure 2:
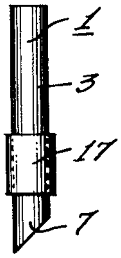
Figure 3:
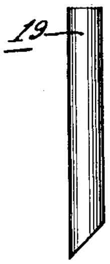

The novel features which are characteristic of the present invention, as well as additional objects and advantages thereof, will be better understood from the following detailed description when read in connection with the accompanying drawing in which:

Figure 1 is a view of the heating apparatus in accordance with the present invention as applied to one type of sapphire recording stylus, Figure 2 is a view of another type of sapphire recording stylus which can be used with the heating apparatus shown in Figure 1, and Figure 3 shows a metal stylus which also can be used with the heating apparatus shown in Figure 1.

Referring more particularly to the drawing, wherein similar reference characters designate corresponding parts throughout, there is illustrated, in Figure 1, a conventional recording stylus 1, such as a sapphire or other, suitable, nonconductive stylus, having one end 3 thereof mounted in a suitable support or holder 5. The opposite end 7 of the stylus is tapered to provide a groove cutting edge for cutting the sound groove in a phonograph record blank in a manner well known in the art.

A coil or winding 9 is concentrically disposed about the stylus 1 in such a manner that the stylus extends axially through the coil. The coil 9 is spaced from the stylus 1 an amount sufficient to permit normal vibratory movement of the stylus during recording operations, but also close enough to effect proper heating by induction. The terminal leads 11 of the coil 9 are connected to any suitable source of alternating, high frequency current 13 (such as an oscillation generator operating at radio frequency) for producing an alternating magnetic field sufficient to cause heating of stylus 1 by induction.

The size of the coil 9 and the power necessary to inductively heat the stylus should be selected at values which will effect the optimum stylus temperature according to the conditions present. However, in order to give some idea of values which have been found satisfactory for heating a sapphire recording stylus similar to that shown in Figure 1, one coil comprised 1½ turns of No. 20 wire, the turns being approximately ⅛" diameter, and a current of about 5 amperes at 6 megacycles per second was fed through the coil.

Induction heating is applicable to all types of recording styli whether they are made from conductive or non-conductive material. If, however, the stylus is made from non-conductive material, such as a sapphire stylus, it is necessary to provide an electrically conductive medium or layer 15 on at least a portion of the surface of the body thereof. This layer or collar 15 should preferably be disposed close to the cutting tip end 7 in order to effect proper heating thereof.

While the conductive medium may be of any type suitable to effect inductive heating of the stylus, it has been found preferable to employ a type such as that illustrated in Figure 1 of the drawing. In this case, a thin layer, coating, or band of silver or gold or other suitable conductive material which will adhere well to the stylus is first deposited on the surface of the stylus so that it encircles and covers at least the portion of the length thereof which is to be disposed within the heating coil. The silver or gold may be deposited by any convenient method, such as chemical deposition, from a reducing solution, or by vaporizing the metal in vacuo and then causing it to condense on the surface of the stylus. A band of iron, nickel or other suitable, electrically conductive material having high magnetic permeability is then deposited over the first layer. An iron layer having a thickness of about 0.002 inch was found to be satisfactory. The deposition may be done by any convenient method, such, for example, as by electroplating. Thus a portion of the surface of the stylus is encircled with a thin coating or band of electrically conductive material 15 which may be said to comprise a shorted, single turn coil.

As an alternative, a recording stylus of the type shown in Figure 2 may be used. The stylus is of non-conductive material similar to that shown in Figure 1, except that it is provided with a band which is in the form of a sleeve or collar 17 of suitable, electrically conductive material such as iron. The band 17 is fitted closely about the stylus so as to be in contact therewith, as well as being disposed in proximity to the record cutting tip thereof. The collar 17 should be of a length at least to extend beyond the axial length of the heating coil.

If, however, an all metal stylus is used, like the stylus 19 illustrated in Figure 3, the stylus itself will comprise the necessary conductive medium for induction coupling with the heating coil when it is disposed within the heating coil in a similar manner to that shown in Figure 1.

Although the stylus holder 5 may comprise any suitable material which will not be affected by heat from the stylus, it should also comprise an electrically non-conductive material in cases where an all metal stylus is employed.

It will be seen, from the foregoing description, that the present invention provides a simple, effective and practical means for heating recording styli. It will be recognized by those persons skilled in the art that modifications and changes of the heating apparatus illustrated and described herein are possible within the spirit of the present invention. Other changes will, no doubt readily suggest themselves to those skilled in the art. Therefore, it is desired that the particular forms of the invention described herein shall be considered as illustrative and not as limiting.

What is claimed is:

1. In sound recording apparatus, the combination of a recording stylus at least a portion of the length of which comprises electrically conductive material and electrically conductive heating means inductively coupled with said stylus conductive portion, said stylus being made of non-conductive material and having a groove cutting edge at one end thereof, said stylus conducting portion comprising a metallic band disposed in close fitting relation about said stylus and in closely spaced relation to said cutting edge.

2. Sound recording apparatus according to claim 1 wherein said stylus conductive portion comprises a thin coating of conductive material on the surface of said stylus.

3. In sound recording apparatus, the combination of a recording stylus comprising a body of sapphire material one end of which is tapered to provide a groove cutting edge, electrically conductive means provided on at least a portion of said stylus adjacent said tapered end, and high frequency heating means inductively coupled with said first mentioned means.

4. A recording stylus for cutting sound grooves in a record, said stylus comprising an electrically non-conductive body having one end thereof tapered to provide a cutting edge, electrically conductive means engaging at least a portion of the surface of said body, said means being disposed adjacent to said cutting edge, and heating means inductively coupled to said conductive means.

5. A recording stylus according to claim 4 wherein said electrically conductive means comprises a thin coating of metal on said body surface portion.

6. A recording stylus according to claim 4 wherein said electrically conductive means comprises a band of metal disposed about said body surface portion.

7. A recording stylus according to claim 6 wherein said band of metal is disposed in close fitting relation about said surface portion.

8. A recording stylus according to claim 4 wherein said body comprises a sapphire material and wherein said electrically conductive means comprises a thin coating of metal on said body surface portion.

9. A recording stylus according to claim 8 wherein at least a portion of said metal coating comprises iron.

10. A recording stylus according to claim 4 wherein said body comprises a sapphire material and wherein said electrically conductive means comprises a band of metal disposed about said body surface portion.

11. Sound recording apparatus comprising, in combination, a source of steady high frequency current, means connected with said current source for producing a uniformly alternating magnetic field, a recording stylus of electrically non-conducting material, and electrically conducting material fixed to a portion intermediate the ends of said stylus and inductively coupled with said magnetic field producing means.

HENRY F. SCHOEMEHL.
HARRY D. WARD.

REFERENCES CITED

The following references are of record in the file of this patent:

UNITED STATES PATENTS

| Number | Name | Date |
|---|---|---|
| 1,271,684 | Emerson | July 9, 1918 |
| 1,649,847 | Nightingall | Nov. 22, 1927 |
| 1,900,843 | Northrup | Mar. 7, 1933 |
| 2,493,466 | Smith | Jan. 3, 1950 |
| 2,495,934 | Kondrath | Jan. 31, 1950 |